US012657564B2

(12) United States Patent
Manzitti et al.

(10) Patent No.: US 12,657,564 B2
(45) Date of Patent: Jun. 16, 2026

(54) ARTIFICIAL INTELLIGENCE-OPERATED AUTONOMOUS POINT-OF-SALE CABINET/REFRIGERATOR OPERATION SYSTEMS AND PROVISION OF RETRACTABLE VIDEO CAMERAS FOR THESE SYSTEMS (MACHINE LEARNING AND COMPUTER VISION)

(71) Applicant: Intuitivo Tech LLC, Wilmington, DE (US)

(72) Inventors: Tomas Manzitti, Buenos Aires (AR); Daniel Gómez, Moraverde (CO); José Benitez, San Lorenzo (PY)

(73) Assignee: Intuitivo Tech LLC, Wilmington, DE (US)

( * ) Notice: Subject to any disclaimer, the term of this patent is extended or adjusted under 35 U.S.C. 154(b) by 0 days.

(21) Appl. No.: 18/851,910

(22) PCT Filed: Mar. 29, 2023

(86) PCT No.: PCT/US2023/016745
§ 371 (c)(1),
(2) Date: Sep. 27, 2024

(87) PCT Pub. No.: WO2023/192391
PCT Pub. Date: Oct. 5, 2023

(65) Prior Publication Data
US 2025/0111350 A1　　Apr. 3, 2025

Related U.S. Application Data

(60) Provisional application No. 63/324,830, filed on Mar. 29, 2022.

(51) Int. Cl.
*G06Q 20/20* (2012.01)
*A47F 3/00* (2006.01)
(Continued)

(52) U.S. Cl.
CPC ........... *G06Q 20/208* (2013.01); *A47F 3/002* (2013.01); *A47F 3/043* (2013.01); *A47F 3/0478* (2013.01);
(Continued)

(58) Field of Classification Search
CPC .... G06Q 20/208; G06Q 20/203; A47F 3/002; A47F 3/043; A47F 3/0478; A47F 10/02;
(Continued)

(56) References Cited

U.S. PATENT DOCUMENTS

2017/0011384 A1　　1/2017　Tkachenko et al.
2021/0058563 A1 *　2/2021　Bashkin .................. H04N 7/181
(Continued)

FOREIGN PATENT DOCUMENTS

CN　　110136328 A　　8/2019

OTHER PUBLICATIONS

International Search Report and Written Opinions, PCT/US2023/016745, Jul. 3, 2023, 9 Pages.

*Primary Examiner* — A. Hunter Wilder
(74) *Attorney, Agent, or Firm* — Goodhue, Coleman & Owens, P.C.

(57) ABSTRACT

Stand-alone, consumer-operable point-of-sale system, comprising a cabinet/refrigerator with a retractable arrangement of one or more video cameras that are mounted or embedded in the frame of the cabinet/refrigerator without occupying volumes on both the outside and inside the of the cabinet/refrigerator, being an absolutely autonomous system governed by artificial intelligence that allows the consumer to select the desired product, pay for it automatically and return it if he/she regretted to leave it and take another one instead, being all the action registered and the operation successfully concluded.

15 Claims, 12 Drawing Sheets

(51) Int. Cl.

| | |
|---|---|
| *A47F 3/04* | (2006.01) |
| *A47F 10/02* | (2006.01) |
| *H04N 7/18* | (2006.01) |
| *H04N 23/90* | (2023.01) |

(52) U.S. Cl.
CPC ........... *A47F 10/02* (2013.01); *G06Q 20/203*
(2013.01); *H04N 23/90* (2023.01); *A47F*
*2010/025* (2013.01); *H04N 7/181* (2013.01);
*H04N 7/188* (2013.01)

(58) Field of Classification Search
CPC .. A47F 2010/025; H04N 23/90; H04N 7/181;
H04N 7/188
See application file for complete search history.

(56) References Cited

U.S. PATENT DOCUMENTS

| | | | |
|---|---|---|---|
| 2021/0201284 A1 | 7/2021 | Tsai et al. |
| 2021/0256791 A1 | 8/2021 | Friend |
| 2021/0342770 A1 | 11/2021 | Li et al. |
| 2022/0065524 A1 | 3/2022 | Schroeder et al. |

* cited by examiner

ARTIFICIAL INTELLIGENCE-OPERATED AUTONOMOUS POINT-OF-SALE CABINET/REFRIGERATOR OPERATION SYSTEMS AND PROVISION OF RETRACTABLE VIDEO CAMERAS FOR THESE SYSTEMS (MACHINE LEARNING AND COMPUTER VISION)

CROSS-REFERENCE TO RELATED APPLICATIONS

This application claims priority under 35 U.S.C. § 119 to provisional application Ser. No. 63/324,830 filed Mar. 29, 2022, which is incorporated by reference in their entirety.

STATE OF THE ART

Field of the Invention

The present invention relates to autonomous vending systems and components for converting refrigerators or cabinets into autonomous points of sale through Artificial Intelligence systems (Machine Learning and Computer Vision), including arrangements and mounting of a plurality of video cameras with novel retractable mounting. And more particularly, the invention relates to a system that allows a user to remove merchandise from a refrigerator or cabinet without having to go through a checkout to pay for it and, at the same time, a system that automatically updates stock and billing data.

Description of Prior Art

There are several systems for the dispensing of consumer products and merchandise, such as beverages and other foodstuffs, which include cabinets and/or refrigerators where they are kept conditioned for a consumer to access them in a condition to be purchased and consumed immediately. In order to avoid having operating and/or surveillance personnel for these systems, video cameras are included that constantly take images of the cabinet or refrigerator as well as of all the products housed therein. However, any camera added to a cabinet or refrigerator, either outside or inside, represents an obstacle. The use of one or more cameras on the outside of the refrigerator generates a volume that does not allow adequate transport in containers from the factory, and if they are placed inside, they take up space that would be useful for product storage.

One type of camera-based vending or vending system may be that disclosed in CN Publication 110136328A that teaches an AI (Artificial Intelligence) intelligent vending cabinet based on dynamic visual recognition. The vending cabinet is communicatively connected to a cloud server. The vending cabinet comprises a cabinet body provided with at least one shelf, a camera disposed on the cabinet body, and a control module connected with the camera and a wireless transmission module; the cloud server includes a dynamic visual recognition algorithm processing module and a storage space; the camera films the whole process in which an object exits the cabinet body in a video and the video is uploaded to the cloud server through the wireless transmission module; video processing calculation recognition is performed by the dynamic visual recognition algorithm; and the recognized result is sent to a user payment terminal through a network for fee deduction.

There are also system solutions that use scales and RFID systems for refrigerators, but they generate a very high operating, installation and maintenance cost. As well as there also exist other solutions with cameras, such as the mentioned Patent Publication CN110136328A, but not being a more simplified and embedded system as the one of the present invention with the compact hardware capable of being embedded in the sides makes such systems of the prior art not at a higher level as to the solution that this invention offers and to the novelty of the invention. Furthermore, the prior art does not offer the low operating and installation costs, having only corrective maintenances (if necessary) since the parts are of long service life, as provided by the present invention.

BRIEF DESCRIPTION OF THE INVENTION

It is therefore an object of the invention to provide a new stand-alone, consumer-operable point-of-sale system, which among other advantages comprises a retractable arrangement of one or more video cameras that are mounted or embedded in the frame of cabinets or refrigerators without occupying volumes both on the outside and inside of the cabinet/refrigerator.

The invention also provides an absolutely autonomous system governed by artificial intelligence that allows the consumer to select the desired product, pay for it automatically and return it if he/she regretted to leave it and take another one instead, being all the action registered and the operation successfully concluded.

DRAWINGS OF THE INVENTION

For greater clarity and understanding of the object of the present invention, the same has been illustrated in several figures, in which the invention has been represented in one of the preferred embodiments, all by way of example, wherein.

DESCRIPTION OF THE INVENTION

Figure 1:
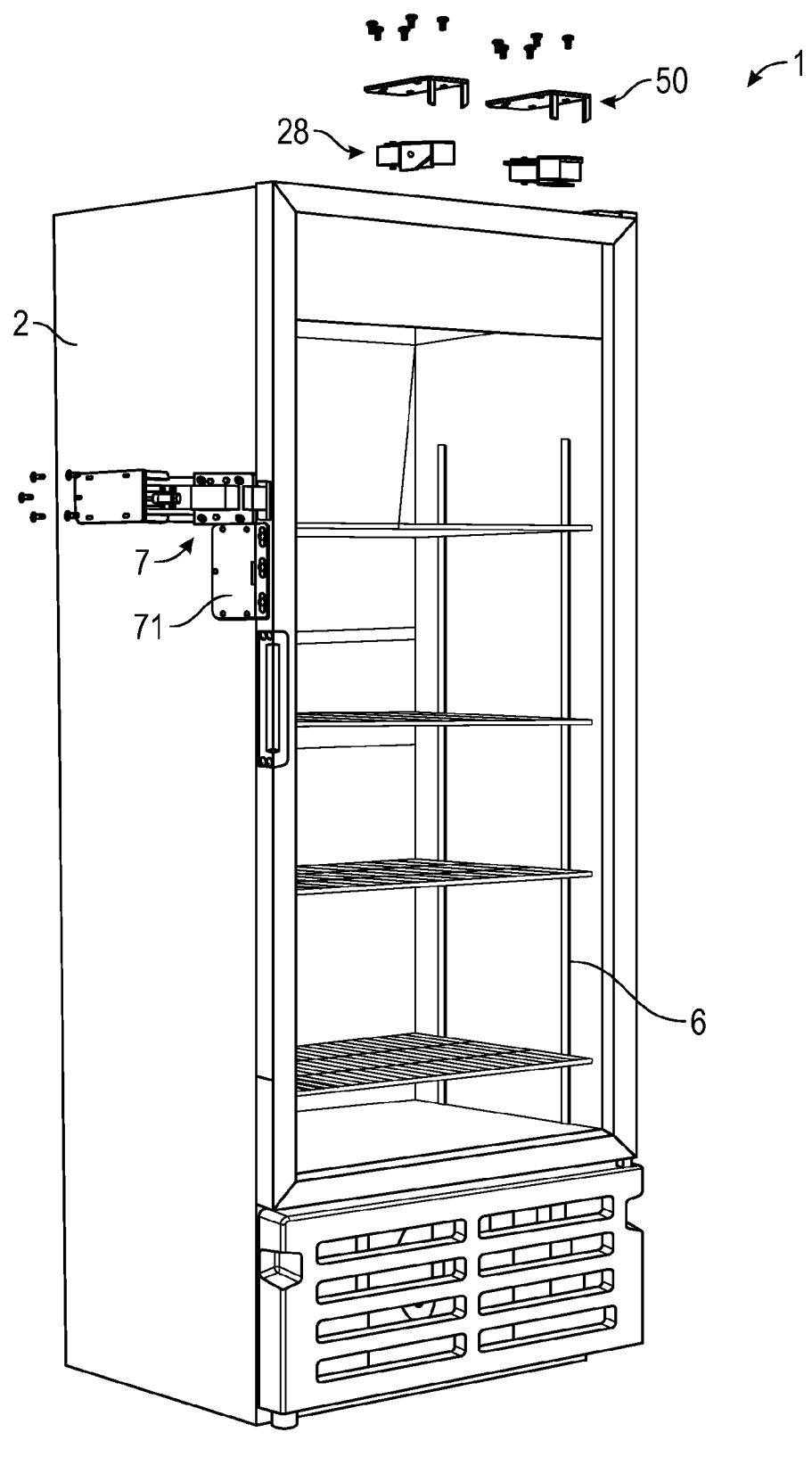
FIG. 1 shows a perspective view of the vending cabinet/refrigerator according to the present invention, wherein the door is closed and the security cameras are retracted.
Figures 2, 3:
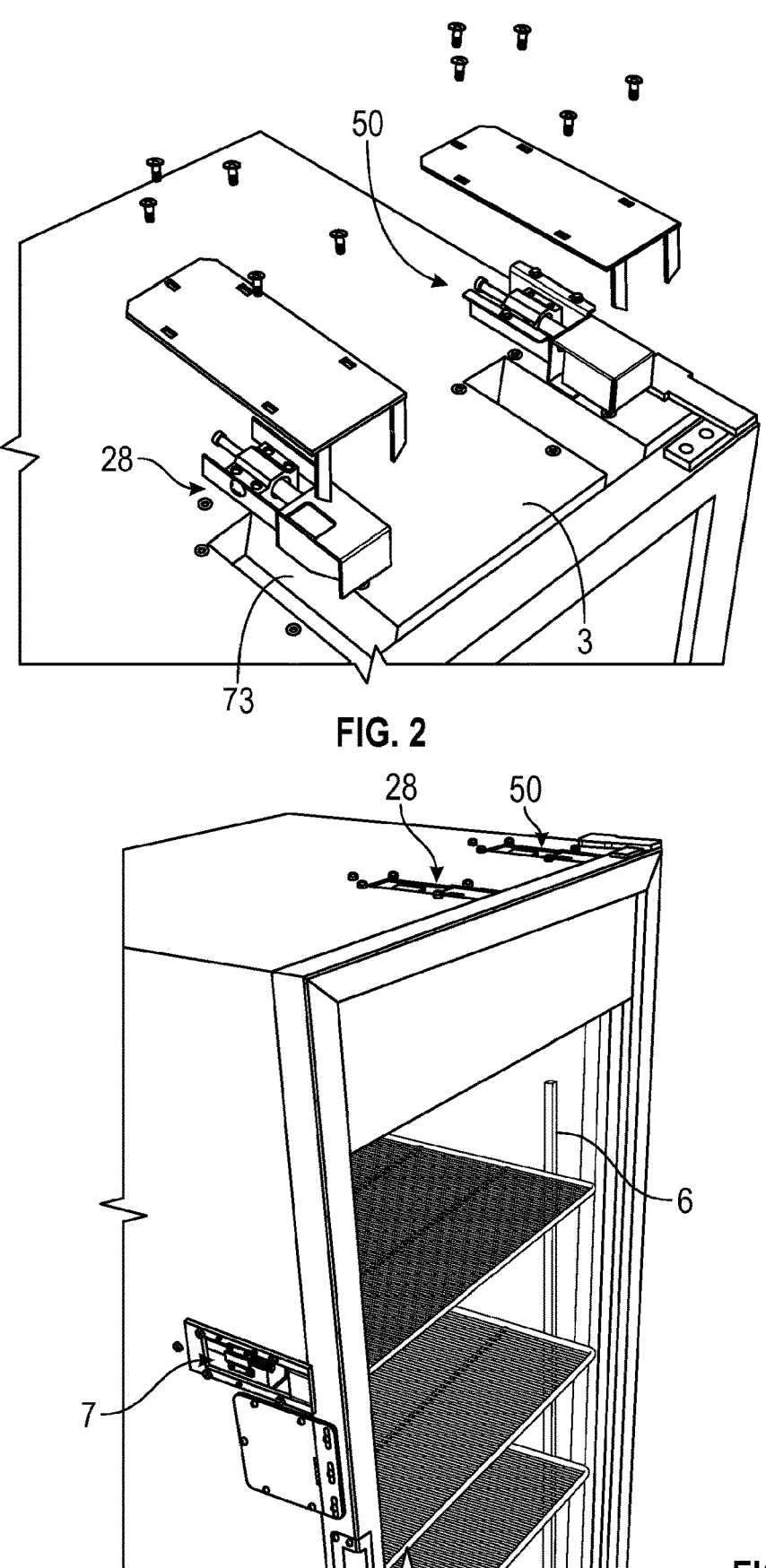
FIG. 2 shows a perspective and partial view of the top of the cabinet/refrigerator, wherein a central camera and a side camera are arranged in accordance with the present invention.
FIG. 3 shows a partial perspective view of the cabinet/refrigerator, wherein the security cameras are retracted in accordance with the present invention.

The invention provides a system for spending, selling, supplying consumer products, operable by the same consumer when purchasing the desired product or products, which has an arrangement of one or more retractable video cameras for refrigerators, for example in cabinet systems or Grab & Go refrigerators.

According to FIGS. 1 to 16, the present invention comprises a cabinet/refrigerator 1 for the vending or sale of various products which comprises side walls 2, top cover 3, interior housing 4 sectioned for various products to be vended, a frame 5 defined by the open perimeter of said cabinet 1 and a pivoting closing door 6. It is emphasized that said cabinet 1 may be provided with respective cooling means as well as means or power supplies that allow the operation of all the systems or components that are part of the same and which, being widely known, will not be described in detail.

As mentioned in the prior art section, such cabinets may be provided with RFID or dynamic visual technology. Unlike the prior art, particularly Publication CN 110136328A, the present invention provides retractable cameras that operate only when the user opens the door 6. That is, when the door is closed, see FIGS. 1 to 5, the cameras are retracted, being "hidden" in the cabinet. Being retractable cameras that are arranged inside the respective parts of the cabinet, they do not occupy physical spaces both external and internal that could be used for storage, being also that they do not obstruct or hinder the transfer or handling of the cabinet.

Wherein the present invention provides at least one retractable side camera 7 disposed in a side portion of said cabinet/refrigerator 1. According to FIGS. 4, 8 and 9, said retractable side camera 7 comprises an external metal plate or housing 8 fixed or embedded within a portion 72 of the side wall of the cabinet/refrigerator 1 through respective fixing means such as screws, bolts, etc., remaining within the section or width delimited by the frame 5 so as not to generate protrusions that complicate the transfer or occupy physical spaces that may be intended for other uses. Likewise, said lateral camera 7 comprises an internal linear bearing 9 mounted on the internal part of said external plate 8 through respective screws 10. Said internal linear bearing 9 may be a bearing of the SCS10UU type, this not being limiting for the present invention.

On the other hand, it is provided with at least one external support 11 mounted on the external part of said external plate 8 through respective screws 12, said external support 11 being provided with at least one external linear bearing 13 which may be a bearing of LM6UU type, this not being limiting for the present invention. In turn, said retractable side camera 7 comprises at least one rod 14 acting as an actuating piston in conjunction with a spring 15, one end of said rod 14 being mounted on said internal linear bearing 9 mounted on the internal part of said external plate and retained by means of an external lock 16, while the other end is connected to a linear rod support 17 which may be a rod support of SHF10 type, this not being limiting for the invention.

Figure 4:
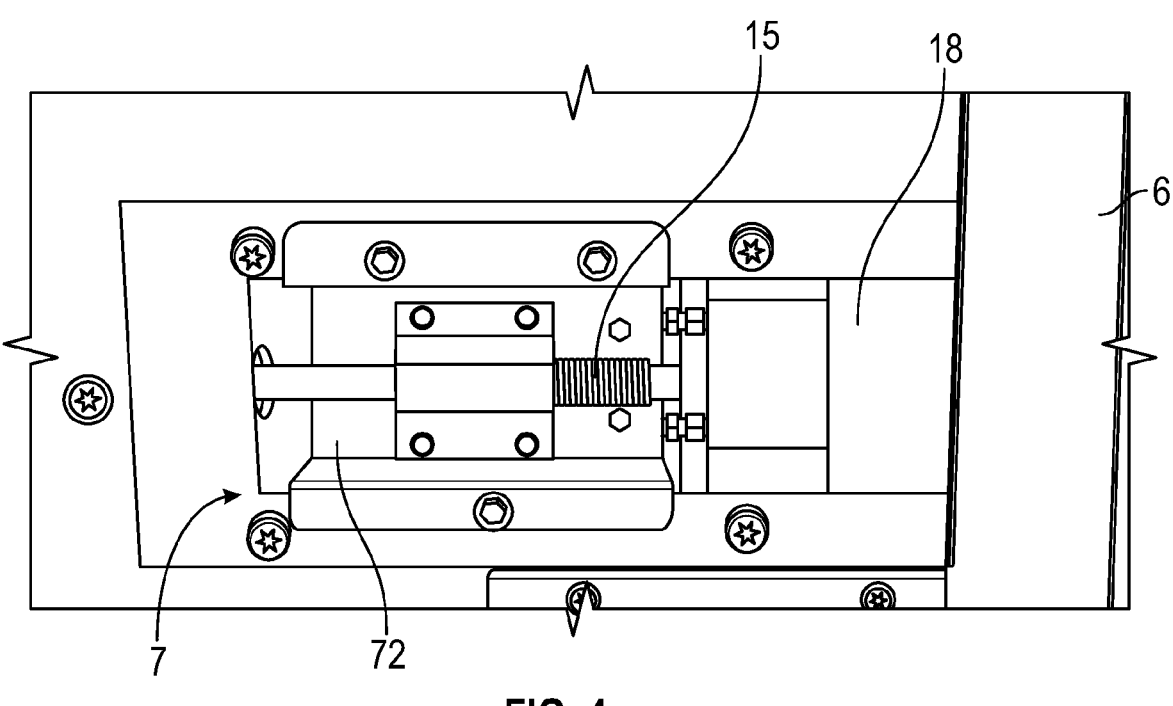
FIG. 4 shows a partial side view of the cabinet/refrigerator of the invention, wherein the retracted side safety camera arrangement can be observed.
Figure 5:
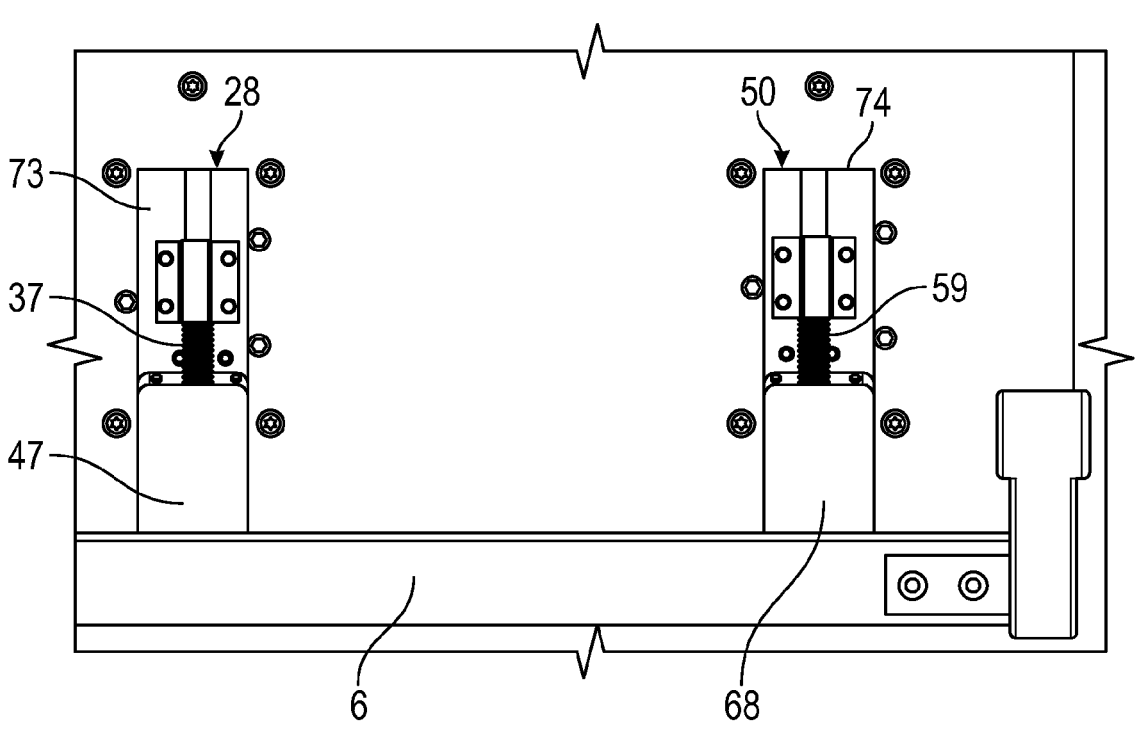
FIG. 5 shows a partial top view of the cabinet/refrigerator of the invention, wherein the arrangement of the retracted upper security cameras can be observed.
Figure 6:
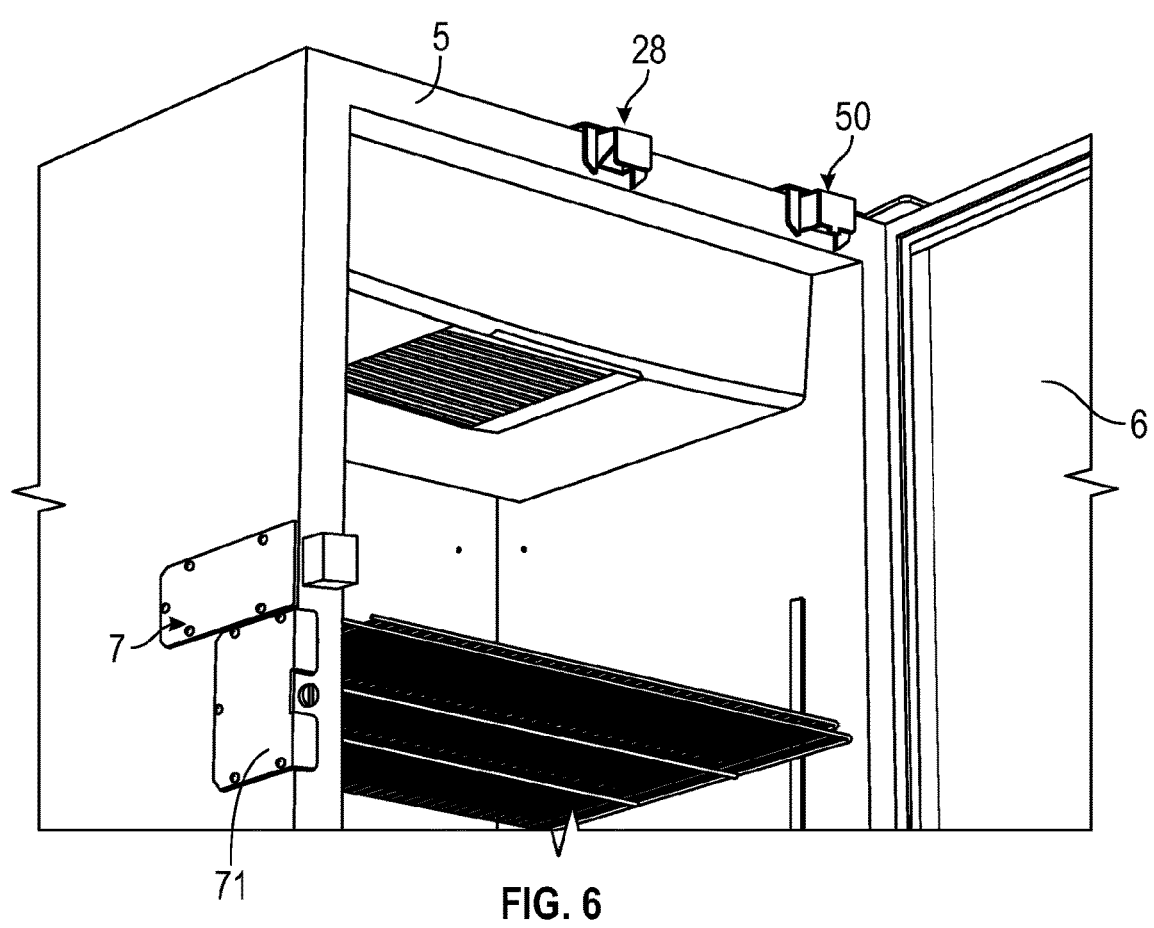
FIG. 6 shows a partial perspective view of the cabinet/refrigerator of the invention, wherein the door is open and the security cameras extended into position to begin filming or recording.
Figure 7:
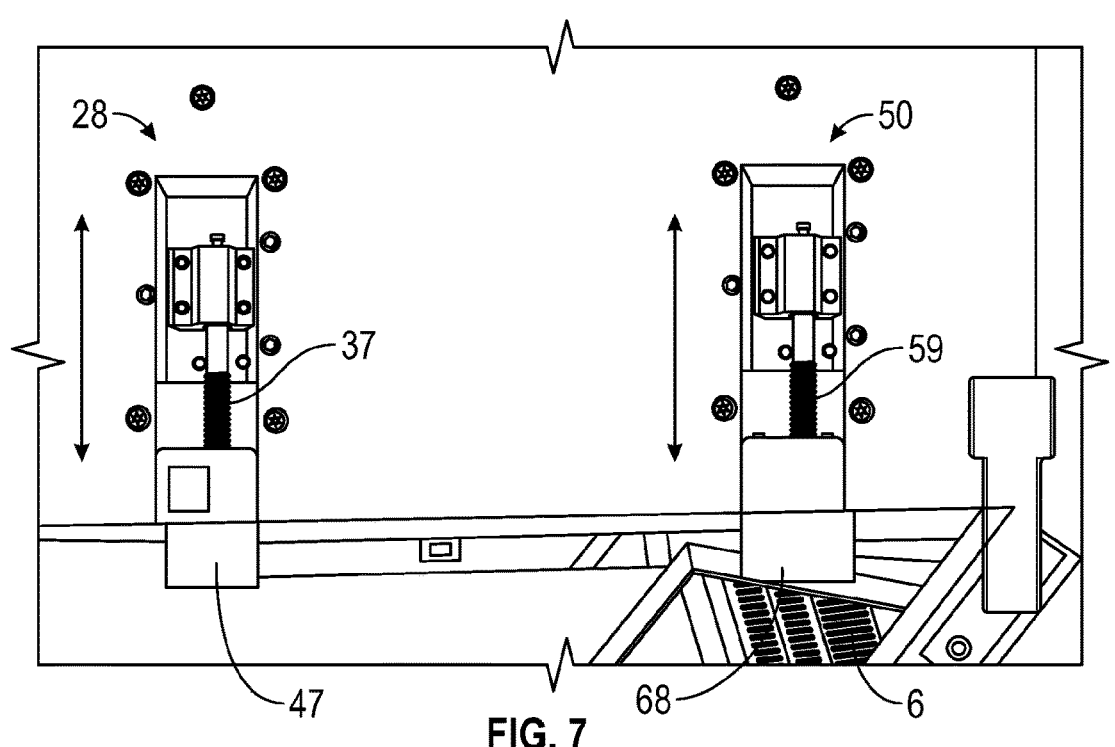
FIG. 7 shows a partial top view of the top of the cabinet/refrigerator according to the present invention, wherein the extended upper cameras can be observed when the door is opened.
Figure 8:
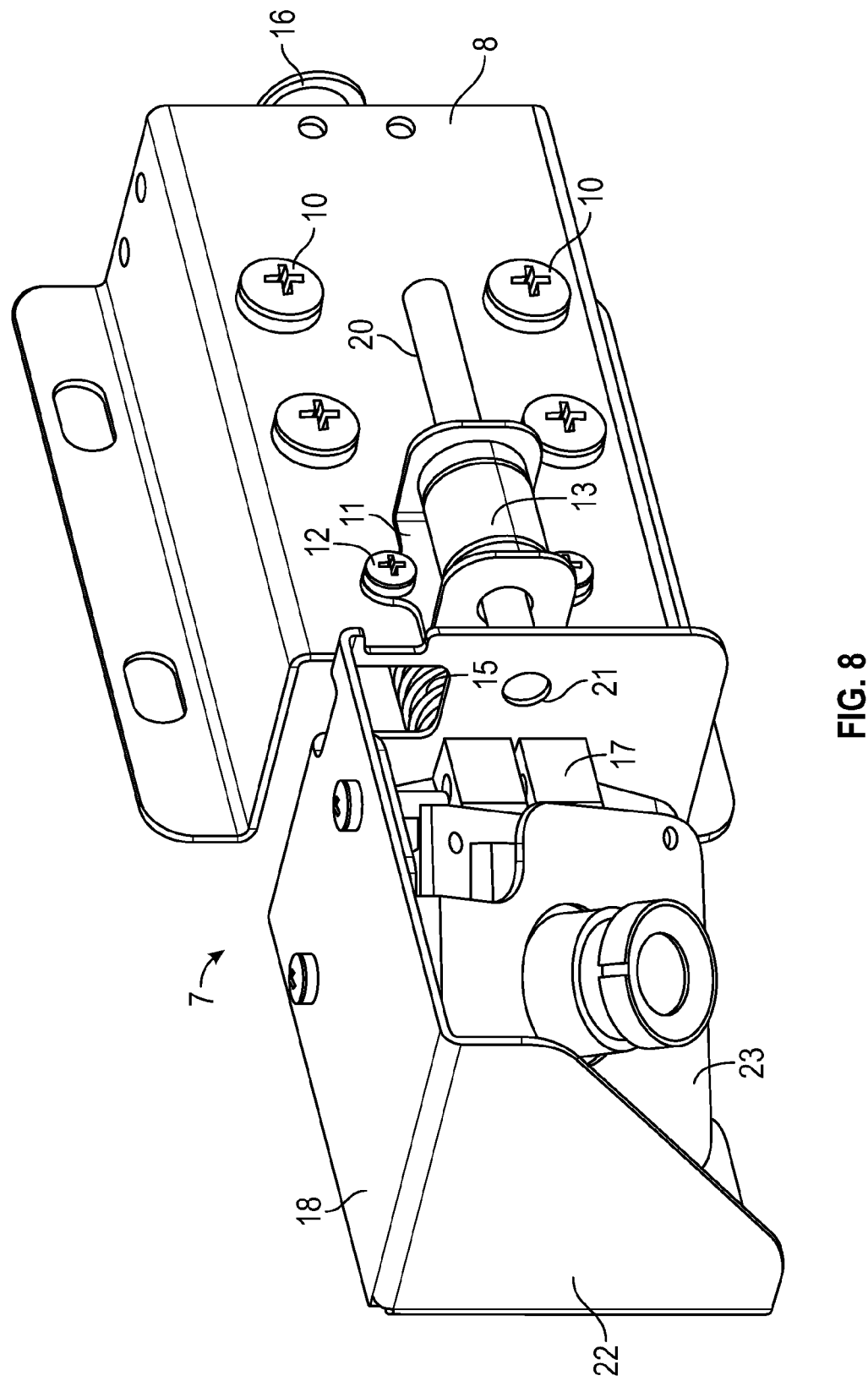
FIG. 8 shows a perspective view of the retractable side camera in accordance with the present invention.
Figure 9:
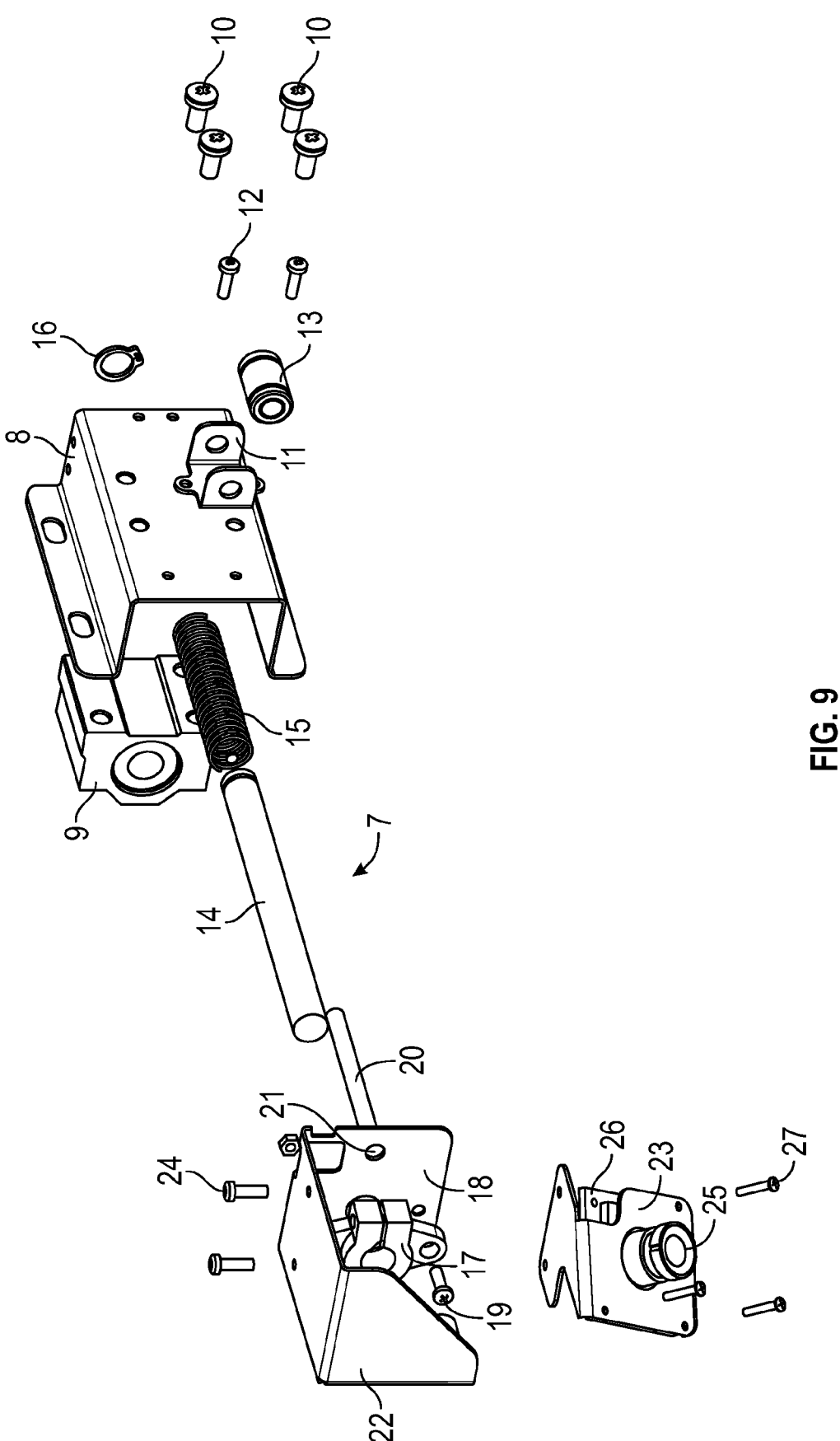
FIG. 9 shows a perspective exploded view of the retractable side camera in accordance with the present invention.
Figure 10:
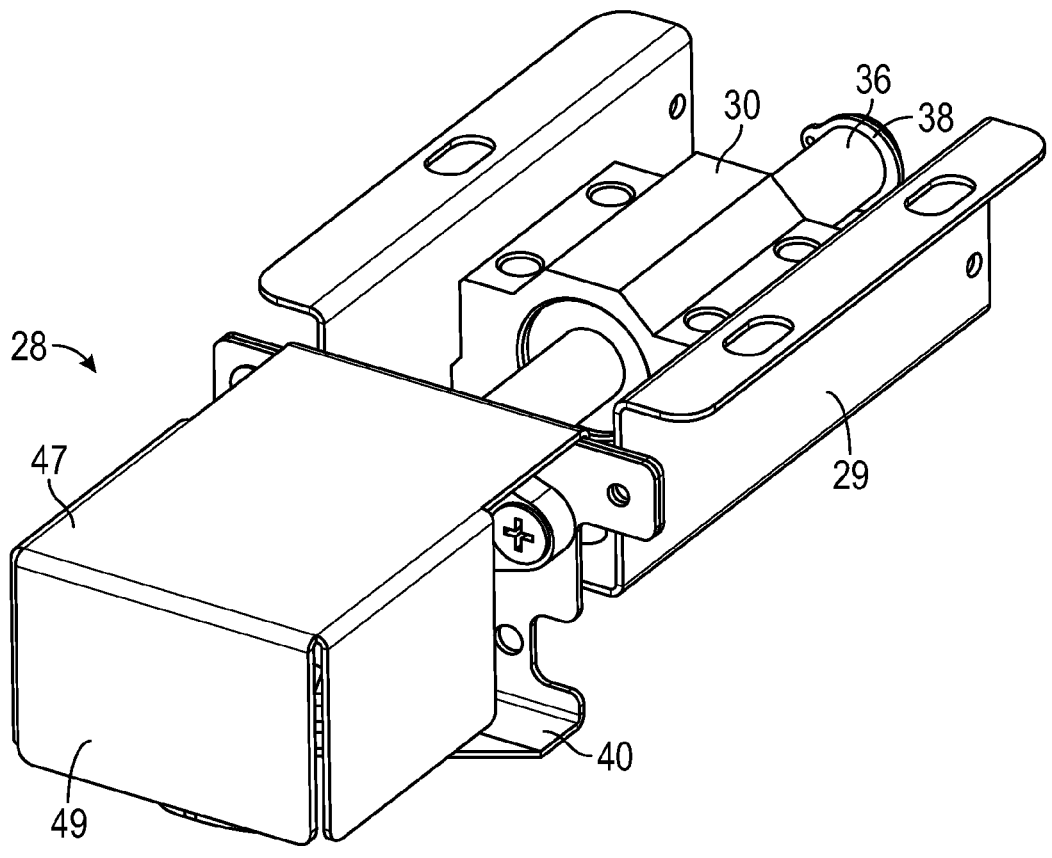
FIG. 10 shows a perspective view of the retractable upper central camera in accordance with the present invention.
Figure 11:
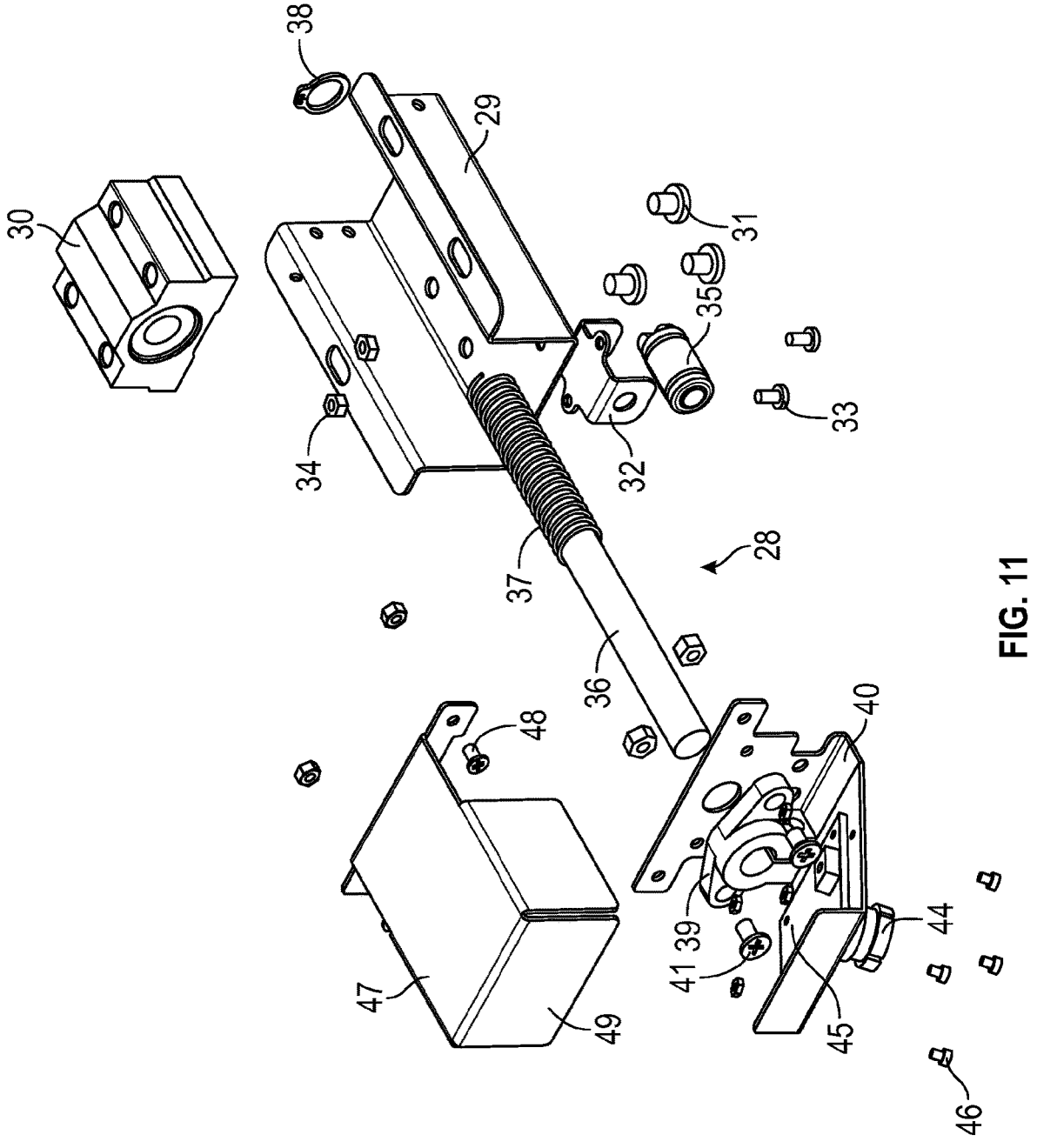
FIG. 11 shows a perspective exploded view of the retractable upper central camera in accordance with the present invention.
Figure 12:
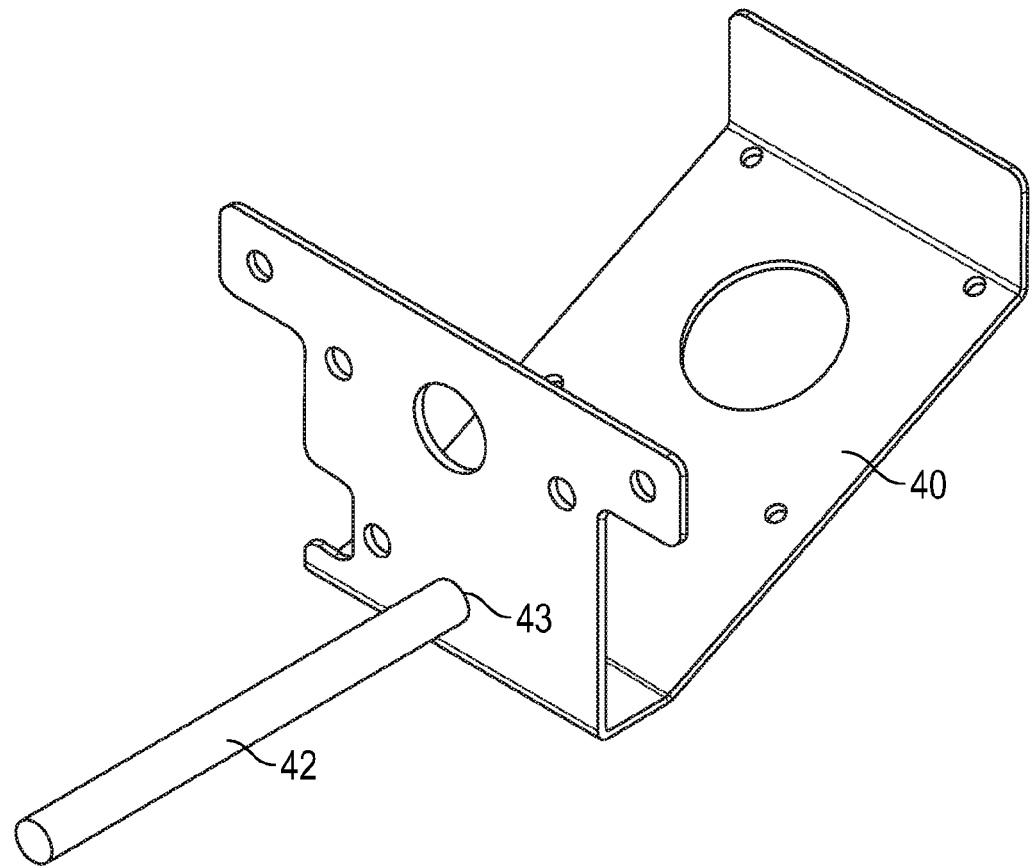
FIG. 12 shows a perspective view of a piston support of a retractable upper central camera in accordance with the present invention.
Figure 13:
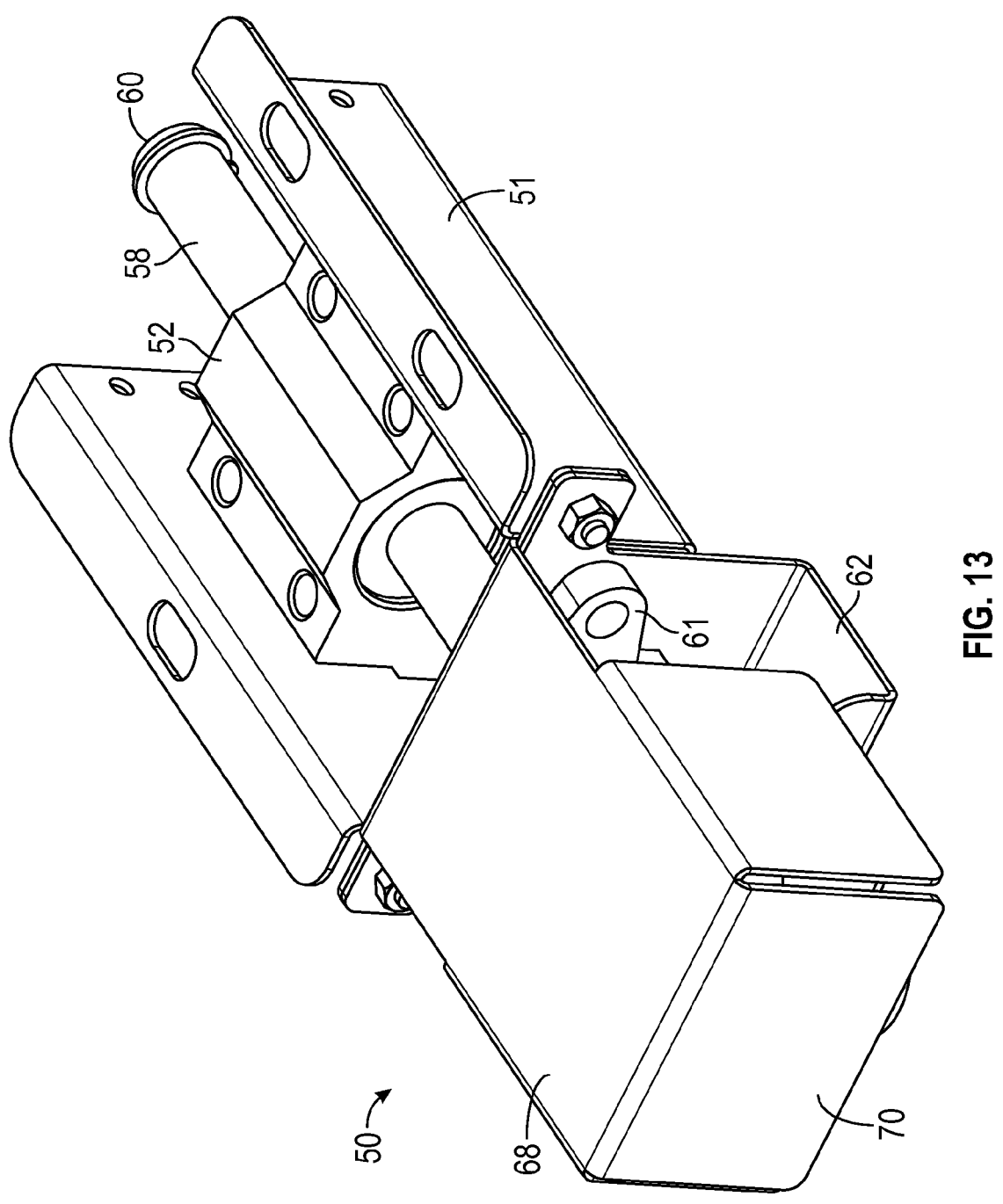
FIG. 13 shows a perspective view of the retractable upper side camera in accordance with the present invention.
Figure 14:
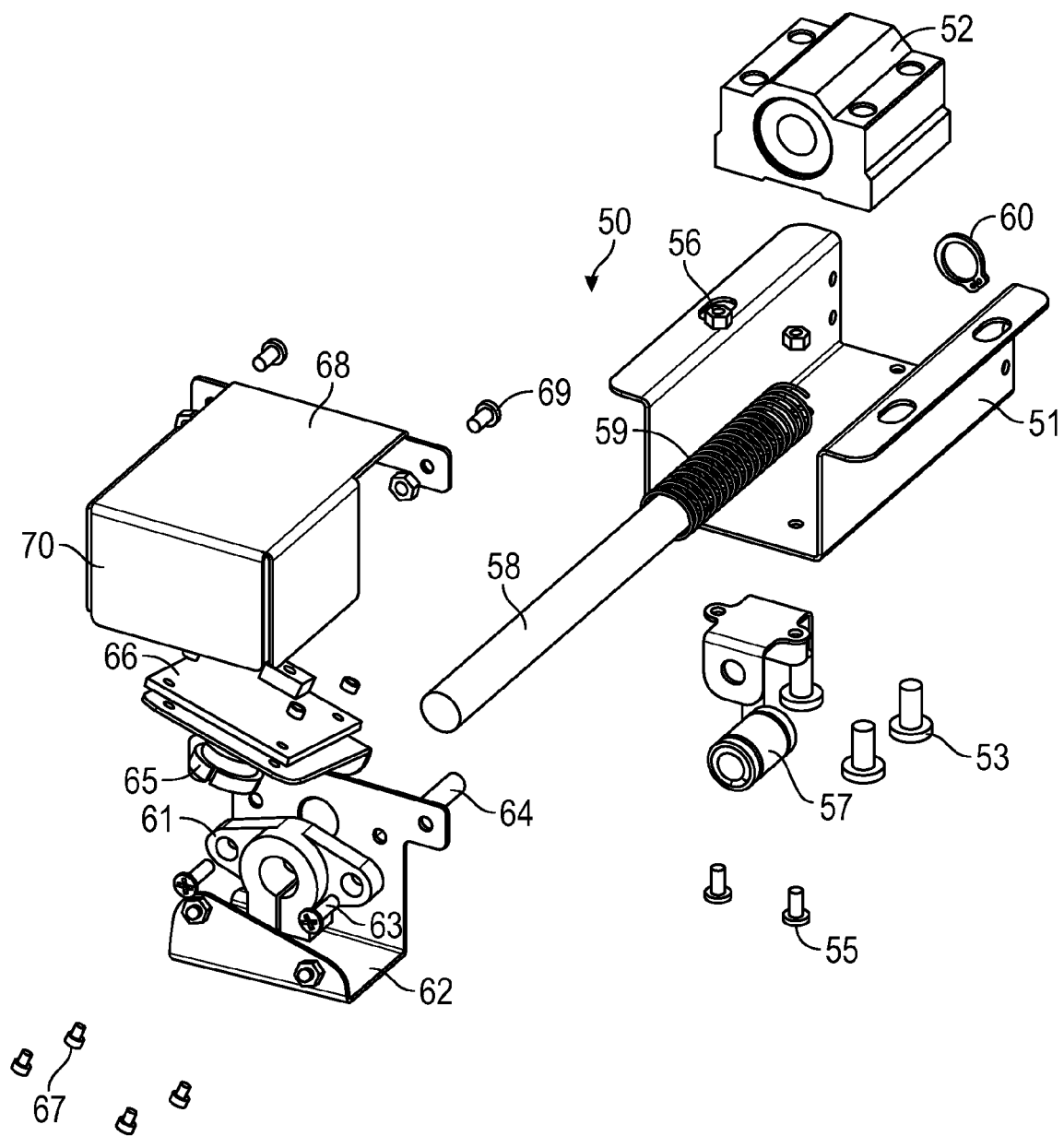
FIG. 14 shows a perspective exploded view of the retractable upper side camera in accordance with the present invention.

As mentioned above, said side camera 7 is retractable and is concealed within the "thickness" of the cabinet. To achieve this, at least one movable piston support 18 is provided on which said linear rod support 17 is mounted through respective screws 19. Also, at least one secondary rod 20 is provided mounted between said external linear bearing 13 and an orifice 21 of said movable piston support 18 which in turn presents a face 22 that comes in contact with the internal part of the door 6, as best illustrated in FIG. 4. Thus, when the door 6 is closed, see FIG. 4, being in contact against the face 22, the piston support 18 is retracted as is the rod 14 in conjunction with the spring 15 which is held compressed. When the door 6 is opened, see FIG. 6, the spring 15 is released returning to its natural state and displacing the piston support 18 "outward" so that the side camera 7 is in its operating position and begins with the recording of what happened. It is emphasized that both said rod 13 and said secondary rod 20 move linearly thanks to the internal linear bearings 9—external 13, respectively, both fulfilling the function of "piston or drive shaft" of the piston support 18.

On the other hand, there is provided at least one camera support 23 mounted on said piston support 18 via respective screws 24 and at least one camera 25 mounted on said camera support 23 via a respective camera-nut assembly 26 and screws 27. The camera support 23 comprises an orifice for the passage of the camera 25 and features a metal plate structure bent in such a way as to generate a certain angle of inclination for the camera 25. The piston support 18 is designed to both house and protect said camera 25.

It is emphasized that said retractable side camera 7 comprises a USB 3.0 side camera, and is angularly positioned about between 30° and 35° with respect to its X axis and about between 110° and 130° with respect to its Y axis. Preferably, but not limiting for the present invention, said retractable side camera 7 is angularly positioned 33° with respect to its X axis and 120° with respect to its Y axis. Thus, when the user opens the door 6, the bar 13—spring 14 "pushes" or displaces the piston support 18 outward so as to position the camera 25 in its operating position and begin recording or filming the sales or replenishment operation. At the end of the sales or replenishment operation, the door closes, coming into contact with the piston support 18 and moving it into the cabinet, thus concealing the camera.

The present invention further comprises a retractable upper central camera 28 disposed within an upper central portion 73 of said cabinet/refrigerator 1, being concealed within the space or width bounded by the frame 5 so that it does not protrude beyond the height of the cabinet. According to FIGS. 5, 7, and 10 to 12, said retractable upper central camera 28 comprises an external metal plate or casing 29 fixed inside the upper lid 3 of the cabinet/refrigerator 1 through respective fixing means such as screws. Likewise, said upper central camera 28 comprises an internal linear bearing 30 mounted on the internal part of said external plate 29 through respective screws 31. Said internal linear bearing

5

30 may be a bearing of SCS10UU type, this not being limiting for the present invention.

On the other hand, it is provided with at least one external support 32 mounted on the external part of said external plate 29 through respective screws 33 and nut 34, said external support 32 being provided with at least one external linear bearing 35 which may be a bearing of LM6UU type, this not being limiting for the present invention. In turn, said retractable upper central camera 28 comprises at least one rod 36 in conjunction with a spring 37, one end of said rod 36 being mounted on said inner linear bearing 30 mounted on the inner side of said external plate and retained by means of an outer lock 38, while the other end is connected to a linear rod support 39 which may be a rod support of type SHF10, this not being limiting for the invention.

As mentioned above, said upper central camera 28 is retractable as is said side camera 7 and is concealed. To achieve this, at least one movable piston support 40 is provided on which said linear rod support 39 is mounted through respective screws 41. Also, at least one secondary rod 42 is provided mounted between said outer linear bearing 35 and an orifice 43 of said movable piston support 40. To carry out the filming or recording of what happens once the door 6 is opened, the invention provides at least one camera 44 mounted on said piston support 40 through a respective assembly support-nut-camera 45 and screws 46. The piston support 40 presents an orifice for the passage of the camera 44 and comprises a metal plate structure bent in such a way to provide an angle of inclination to the camera 44.

Likewise, a camera protector 47 is provided which is mounted on said piston support 40 by means of respective screws 48 and which has a face 49 that comes in contact with the internal part of the door 6. In this way, when the door 6 is closed, see FIG. 5, being in contact with the face 49, the piston support 40 is retracted as well as the rod 36 in conjunction with the spring 37 which is kept compressed. When the door 6 is opened, see FIG. 7, the spring 37 is released and returns to its natural state displacing the piston support 40 "outwards" in order to position the camera 44 and start recording what happened. Said rod 36—secondary rod 42 move linearly thanks to the internal 30—external linear bearings 35, respectively, and perform the function of "axis or drive piston" of the piston support 40.

On the other hand, said retractable upper central camera 28 comprises a USB 3.0 side camera, and is angularly positioned about between 20° and 30° with respect to its X axis. Preferably, but not limiting for the present invention, said upper central camera 28 is angularly positioned 26° with respect to its axis X. Thus, when the user opens the door 6, the bar 36—spring 37 "pushes" or displaces the piston support 40 outward so as to position the camera 44 in its operating position and begin recording or filming the sales or replenishment operation. At the end of the sales or replenishment operation, the door 6 closes, coming into contact with the face 49 of the camera protector 47, displacing the assembly inside the cabinet, thus concealing the camera.

In order to cover a larger field of view at the time of recording and thus provide a better service and in turn, avoid possible accidents, the present invention further comprises a retractable upper side camera 50 disposed within an upper side portion 74 of said cabinet/refrigerator 1, being concealed within the space or width delimited by the frame 5 so that it does not protrude beyond the height of the cabinet. According to FIGS. 5, 7, 13 and 14, said retractable upper side camera 50 comprises an external metal plate or casing 51 fixed inside the upper lid 3 of the cabinet/refrigerator 1 through respective fixing means such as screws. Likewise, said upper side camera 50 comprises an internal linear bearing 52 mounted on the inner side of said external metal plate 51 through respective screws 53. Said internal linear bearing 52 may be a bearing of SCS10UU type, this not being limiting for the present invention.

On the other hand, it is provided with at least one external support 54 mounted on the external part of said external plate 51 through respective screws 55 and nut 56, said external support 54 being provided with at least one external linear bearing 57 which may be a bearing of LM6UU type, this not being limiting for the present invention. In turn, said retractable upper side camera 50 comprises at least one bar 58 in conjunction with a spring 59, one end of said bar 58 being mounted on said internal linear bearing 52 mounted on the inner side of said external plate and retained by means of an external lock 60, while the other end is connected to a linear bar support 61 which may be a bar support of SHF10 type, this not being limiting for the invention.

As mentioned above, said upper side camera 50 is retractable and is concealed just like said upper side camera 7 and upper central camera 28. To achieve this, at least one movable piston support 62 is provided on which said linear rod support 61 is mounted through respective screws 63. Also, at least one secondary rod 64 is provided mounted between said outer linear bearing 57 and an orifice (not illustrated) of said movable piston support 62. To carry out the filming or recording of what happens once the door 6 is opened, the invention provides at least one camera 65 mounted on said piston support 62 through a respective assembly of camera-nut 66 and screws 67. The piston support 62 comprises an orifice for the passage of the camera 65 and comprises a bent metal plate structure determining a certain angle of inclination for said camera 65.

Likewise, it is provided with a camera protector 68 mounted on said piston support 62 through respective screws 69 and which presents a face 70 that comes in contact with the internal part of the door 6. In this way, when the door 6 is closed, see FIG. 5, being in contact with the face 70, the piston support 62 is retracted as well as the rod 58 in conjunction with the spring 59 that is kept compressed. When the door 6 is opened, see FIG. 7, the spring 59 returns to its natural state displacing the piston support 62 "outward" so as to allow the recording of the event. Said rod 58—secondary rod 64 move linearly thanks to the internal 52—external 57 linear bearings, respectively, and perform the function of "axis or drive piston" of the piston support 62.

On the other hand, said retractable upper side camera 50 comprises an upper side USB 2.0 camera, and is angularly positioned about between 10° and 20° with respect to its X axis and about between 70° and 80° with respect to its Y axis. Preferably, but not limiting for the present invention, said retractable upper side camera 50 is angularly positioned 15° with respect to its X axis and 75° with respect to its Y axis. Thus, when the user opens the door 6, the bar 58—spring 59 "pushes" or displaces the piston support 62 outward so as to position the camera 65 in its operating position and begin recording or filming the sales or replenishment operation. At the end of the sale or replenishment operation, the door 6 closes, coming into contact with the face 70 of the camera protector 68, moving the assembly into the cabinet, thus concealing the camera.

Thus, by having three cameras 7, 28 and 50 strategically positioned in different parts of the cabinet, a greater visual width and height is covered to provide a better shopping and replenishment experience, as well as to alert to any incident or altercation that may occur.

Figure 15:
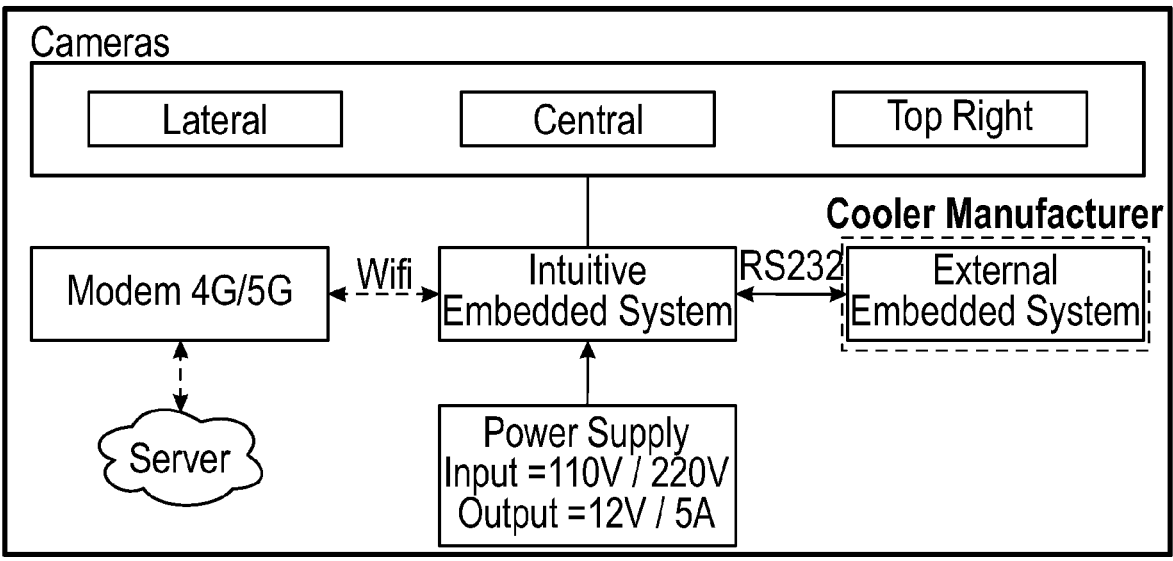
FIG. 15 shows a schematic of connection of the different parts of the cabinet/refrigerator in accordance with the present invention.
Figure 16:
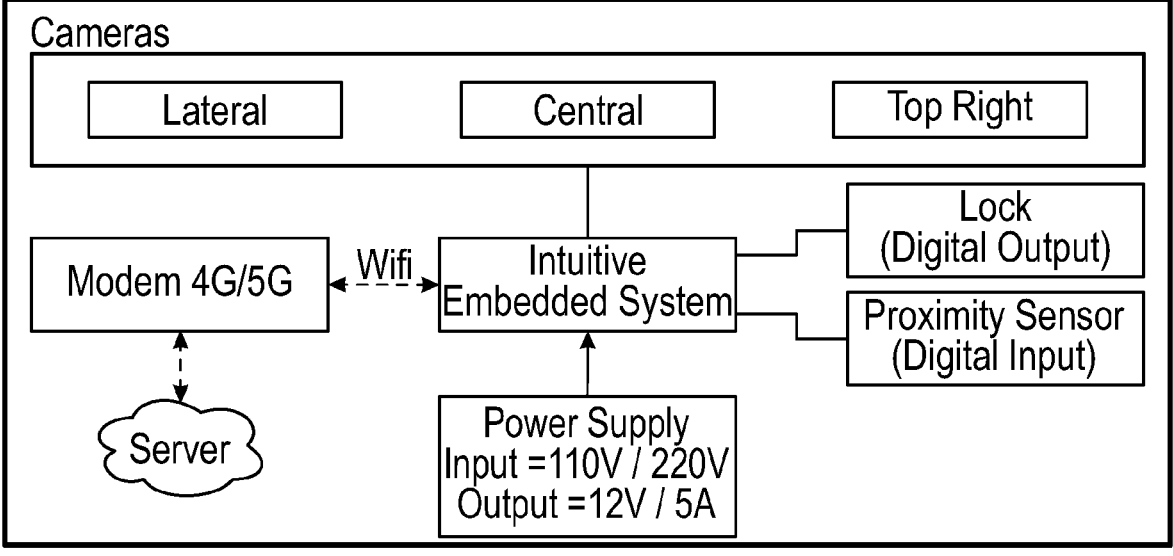
FIG. 16 shows another connection scheme of the different parts of the cabinet/refrigerator according to the present invention.

Thus, the retractable video camera system or arrangement is embedded in the frame within the walls of the refrigerator or cabinet. Each camera has a metal housing with a spring system to which a USB camera is attached. This system is attached with screws and its functionality is to capture images to resolve transactions with the vending system of the invention. Each camera is connected to a CPU through respective data and power cables. The CPU is in turn connected to a server in a cloud. The server is managed so as to generate the different orders to the CPU to open the door, as well as for the generation of sales tickets, stock shortage alerts, replenishment, theft alerts, etc., as best illustrated in the diagrams of FIGS. 15 and 16.

Thus, the system of the present invention operates when a user unlocks the door of the cabinet or refrigerator which is closed by means of an intelligent locking system 71. Once the door is opened, see FIGS. 6 and 7, the rod-spring assembly of each camera pushes on the piston support bringing the camera to a specific angle. Each camera is in a protruding position relative to the refrigerator frame and allows images to be captured at the specified angle. Once the refrigerator is closed, the door pushes this system back inward, allowing it to retract and only remain outside, relative to the refrigerator frame, when the refrigerator door is open. In this way, when the cameras are not in use, they do not occupy useful space.

These metal housings and cameras are preferably located at three different points and angles but more preferably between the frame walls so as to cover a larger field of view as mentioned above.

The invention thus provides a design and development of components to be installed in refrigerators or cabinets so as to convert them into self-contained outlets. As mentioned above, the invention comprises a CPU (not illustrated) to which are connected said side retractable cameras 7, upper central 28 and upper side 50 and other systems such as the intelligent lock 71 which can be an electronic padlock of the doors, as well as the different universal plates (external embedded system) that allow the operation of refrigerators with intelligent systems. All electrical/electronic parts or components are duly commanded by the CPU and powered by a power supply.

Equipment Installation Process

In order to install the equipment, the firmware (proprietary software running on the CPU) has a web interface so that the installation technician can perform the necessary tests of operation and connection to the WiFi network of the place to be installed.

Purchase Process (Stand-Alone Point-of-Sale Functionality)

The system of the invention allows a user to remove merchandise from a refrigerator or cabinet without having to go through a checkout to pay for it. The transaction basically consists of a person (the user) scanning a QR code with a web application (app) developed by the system provider, which goes through a registration process within the app. Once this registration is completed, the app unlocks the refrigerator or cabinet door, releasing an electric lock provided by the system supplier or, in some cases, by the refrigerator manufacturers. This lock, see FIG. 16, is commanded by the CPU (intuitive embedded system) which contains an interface board connected to the Internet via WiFi and connected to the system provider's API (Application Program Interface) in the cloud via the Internet. When the refrigerator door is opened, the CPU automatically triggers the signal for the cameras to start recording the transaction, recording on video the action the user performs with the refrigerator or cabinet. Once the user has chosen the product or not, closes the door and with the help of a proximity sensor, which detects the closed door, sends the signal to the CPU to finish recording the videos. These videos are sent to the system provider's servers where they are temporarily stored in order to be updated in the system's transaction software.

This program, based on Computer Vision and Machine Learning within the field of Artificial Intelligence, is in charge of processing the videos and creating a ticket to charge the user automatically with the credit/debit card registered at the beginning with the web application, or also generate an alert, for example, if an attempt has been made to hide products, or if the products are not seen properly in the videos, so that later, an employee of the establishment reviews them and resolves the transaction correctly. This review process is performed in a web-based dashboard program (*) provided by the system provider where there are also different user levels for operators, customers and managers. In this "dashboard" the customer can visualize the transactions and all the data that informs who is the user who made the purchase, the product purchased and the store of sale, as well as the real time stock of the machines (refrigerators, cabinets) and their different states. A dashboard is an information management tool that monitors, analyzes and visually displays key performance indicators (KPIs), metrics and key data to track the status of a company, a department, a campaign or a specific process.

Replenishment Process for Refrigerators and Freezers

For this process, through a web or native application where the employee who wants to replenish the refrigerator or cabinet can initiate this operation, the employee scans the QR code and manually inserts the products to be added, takes a general photo of the front of the refrigerator with the products for a record and then sends them to the system servers to update the data on the dashboard.

Thus, the buying user is provided with a shopping experience without the need to pay at the "cash register" and wait in long lines. Likewise, the seller user can easily know the real-time stock of his products. At the same time, being retractable cameras that do not occupy physical space that can be used for other purposes, they are easy to handle and move. Again, since the cameras are hidden inside the cabinet and retractable, they only operate when the door is opened. When the door is opened, see FIGS. 6-7, the spring provided in each camera system ejects the piston support so as to position each camera at its predetermined angle and thus start recording the sales transaction as mentioned above. When the buying user closes the door, see FIG. 5, the piston support retracts simultaneously with the compression of the spring and the cameras finish recording, which is then uploaded to the server for storage.

What is claimed is:

1. An artificial intelligence operated autonomous point-of-sale cabinet/refrigerator operation system, wherein said cabinet/refrigerator comprises a sectioned interior housing for various products to be vended, a frame defined by the open perimeter of said cabinet, a pivoting locking door, an intelligent door locking system and power supply; further provided with at least one mechanically actuated retractable side camera disposed in a side portion of said cabinet/refrigerator; at least one mechanically actuated retractable upper center camera disposed in an upper center portion of said cabinet/refrigerator; at least one retractable upper side camera disposed in an upper side portion of said cabinet/refrigerator; wherein said retractable side, upper center, and upper side cameras are in a retracted position when the cabinet/refrigerator door is closed, while extending to film or record in response to opening of said door without requiring user input or authentication; said retractable cameras being connected to a CPU that communicates wirelessly with a cloud server to autonomously manage product tracking and transaction processing using vision-based inference;
    wherein each of said side, upper central and upper side retractable cameras comprises:
        an external plate fixed to a side wall of the cabinet/refrigerator;
        an inner linear bearing mounted on an inner side of said external plate;
        at least one external support mounted on an external part of said external plate, said at least one external support being provided with at least one outer linear bearing;
        at least one rod in conjunction with a spring, one end of said rod mounted on said inner linear bearing mounted on the inner side of said external plate and fixed by an external lock, while the other end of said rod mounted on said inner linear bearing is connected to a linear rod support;
        at least one movable piston support on which the linear bar support is mounted; and
        at least one secondary rod mounted between said outer linear bearing and a bore of said at least one movable piston support.

2. The artificial intelligence operated autonomous point-of-sale cabinet/refrigerator operation system according to claim 1, wherein said intelligent locking system is driven by said CPU which receives the drive signals via the cloud server.

3. The artificial intelligence operated autonomous point-of-sale cabinet/refrigerator operation system according to claim 1, wherein a mobile application is provided that is connected to the cloud server, so as to generate cabinet door opening, perform payment for the selected product as well as for stock replenishment.

4. The artificial intelligence operated autonomous point-of-sale cabinet/refrigerator operation system according to claim 1, further wherein said retractable side camera comprises at least one camera support mounted on said piston support; and at least one camera mounted on said camera support, being mounted by a respective assembly of camera-nut-screws.

5. The artificial intelligence operated autonomous point-of-sale cabinet/refrigerator operation system according to claim 1, further wherein said retractable top center and side cameras each comprise at least one camera protector mounted on said piston support; and at least one camera mounted on said piston support, being mounted by a respective assembly of support-camera-nut-screws.

6. The artificial intelligence operated autonomous point-of-sale cabinet/refrigerator operation system according to claim 1, wherein:
    said inner linear bearing is a bearing of SCS10UU type;
    said outer linear bearing is a bearing of LM6UU type;
    said linear bar support is a bar support of SHF10 type.

7. The artificial intelligence-operated autonomous point-of-sale cabinet/refrigerator operation system according to claim 4, wherein said retractable side camera comprises a side USB 3.0 camera, and is angularly positioned about 30° to 35° with respect to its X axis and about 110° to 130° with respect to its Y axis.

8. The artificial intelligence operated autonomous point-of-sale cabinet/refrigerator operation system according to claim 7, wherein said retractable side camera is angularly positioned 33° with respect to its X axis and 120° with respect to its Y axis.

9. The artificial intelligence-operated autonomous point-of-sale cabinet/refrigerator operation system according to claim 5, wherein said retractable top central camera comprises a central top USB 3.0 camera, and is angularly positioned about 20° to 30° with respect to its X axis.

10. The artificial intelligence-operated autonomous point-of-sale cabinet/refrigerator operation system according to claim 9, wherein said retractable upper center camera is angularly positioned 26° with respect to its X axis.

11. The artificial intelligence operated autonomous point-of-sale cabinet/refrigerator operation system according to claim 5, wherein said retractable upper side camera comprises an upper side USB 2.0 camera, and is angularly positioned between about 10° and 20° with respect to its X axis and between about 70° and 80° with respect to its Y axis.

12. The artificial intelligence operated autonomous point-of-sale cabinet/refrigerator operation system according to claim 11, wherein said retractable upper side camera is angularly positioned 15° with respect to its X axis and 75° with respect to its Y axis.

13. An artificial intelligence operated autonomous point-of-sale cabinet/refrigerator operation system, wherein said cabinet/refrigerator comprises a sectioned interior housing for various products to be vended, a frame defined by the open perimeter of said cabinet, a pivoting locking door, an intelligent door locking system and power supply; further provided with at least one retractable side camera disposed in a side portion of said cabinet/refrigerator; at least one retractable upper center camera disposed in an upper center portion of said cabinet/refrigerator; at least one retractable upper side camera disposed in an upper side portion of said cabinet/refrigerator; wherein said retractable side, upper center, and upper side cameras are in a retracted position when the cabinet/refrigerator door is closed, while extending to film or record when the user opens the door; said retractable cameras being connected to a CPU that communicates wirelessly with a cloud server; wherein each of said side, upper central and upper side retractable cameras comprise:
    an external plate fixed to a side wall of the cabinet/refrigerator;
    an inner linear bearing mounted on the inner side of said external plate;
    at least one external support mounted on the external part of said external plate, said external support being provided with at least one outer linear bearing;
    at least one rod in conjunction with a spring, being one end of said rod mounted on said inner linear bearing mounted on the inner part of said external plate and fixed by an external lock, while the other end is connected to a linear rod support; at least one movable piston support on which said linear bar support is mounted; and
    at least one secondary rod mounted between said outer linear bearing and a bore of said movable piston support; further wherein said retractable side camera comprises at least one camera support mounted on said piston support; and at least one camera mounted on said camera support, being mounted by a respective assembly of camera-nut-screws.

14. An artificial intelligence operated autonomous point-of-sale cabinet/refrigerator operation system, wherein said cabinet/refrigerator comprises a sectioned interior housing for various products to be vended, a frame defined by the open perimeter of said cabinet, a pivoting locking door, an intelligent door locking system and power supply; further provided with at least one retractable side camera disposed in a side portion of said cabinet/refrigerator; at least one retractable upper center camera disposed in an upper center portion of said cabinet/refrigerator; at least one retractable upper side camera disposed in an upper side portion of said cabinet/refrigerator; wherein said retractable side, upper center, and upper side cameras are in a retracted position when the cabinet/refrigerator door is closed, while extending to film or record when the user opens the door; said retractable cameras being connected to a CPU that communicates wirelessly with a cloud server; wherein each of said side, upper central and upper side retractable cameras comprises:

an external plate fixed to a side wall of the cabinet/refrigerator;

an inner linear bearing mounted on the inner side of said external plate;

at least one external support mounted on the external part of said external plate, said external support being provided with at least one outer linear bearing;

at least one rod in conjunction with a spring, being one end of said rod mounted on said inner linear bearing mounted on the inner part of said external plate and fixed by an external lock, while the other end is connected to a linear rod support; at least one movable piston support on which said linear bar support is mounted; and at least one secondary rod mounted between said outer linear bearing and a bore of said movable piston support; further wherein said retractable top center and side cameras each comprise at least one camera protector mounted on said piston support; and at least one camera mounted on said piston support, being mounted by a respective assembly of support camera-nut-screws.

15. An artificial intelligence operated autonomous point-of-sale cabinet/refrigerator operation system, wherein said cabinet/refrigerator comprises a sectioned interior housing for various products to be vended, a frame defined by the open perimeter of said cabinet, a pivoting locking door, an intelligent door locking system and power supply; further provided with at least one retractable side camera disposed in a side portion of said cabinet/refrigerator; at least one retractable upper center camera disposed in an upper center portion of said cabinet/refrigerator; at least one retractable upper side camera disposed in an upper side portion of said cabinet/refrigerator; wherein said retractable side, upper center, and upper side cameras are in a retracted position when the cabinet/refrigerator door is closed, while extending to film or record when the user opens the door; said retractable cameras being connected to a CPU that communicates wirelessly with a cloud server; wherein each of said side, upper central and upper side retractable cameras comprises:

an external plate fixed to a side wall of the cabinet/refrigerator;

an inner linear bearing mounted on the inner side of said external plate;

at least one external support mounted on the external part of said external plate, said external support being provided with at least one outer linear bearing;

at least one rod in conjunction with a spring, being one end of said rod mounted on said inner linear bearing mounted on the inner part of said external plate and fixed by an external lock, while the other end is connected to a linear rod support;

at least one movable piston support on which said linear bar support is mounted; and at least one secondary rod mounted between said outer linear bearing and a bore of said movable piston support; further wherein:

said inner linear bearing is a bearing of SCS10UU type;

said outer linear bearing is a bearing of LM6UU type; and said linear bar support is a bar support of SHF10 type.

* * * * *